(12) United States Patent
Slim et al.

(10) Patent No.: US 6,989,046 B1
(45) Date of Patent: Jan. 24, 2006

(54) METHOD FOR REMOVING POLYMER FROM AN ACID GAS TREATING SYSTEM

(75) Inventors: David R. Slim, Sarnia (CA); Ernest V. Vilcsak, Sarnia (CA)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 10/204,583

(22) PCT Filed: Mar. 2, 2000

(86) PCT No.: PCT/US00/05496

§ 371 (c)(1),
(2), (4) Date: Feb. 21, 2003

(87) PCT Pub. No.: WO01/64609

PCT Pub. Date: Sep. 7, 2001

(51) Int. Cl.
*C07C 7/11* (2006.01)
*B01D 53/14* (2006.01)

(52) U.S. Cl. ............ 95/181; 95/183; 95/188; 95/237; 423/228

(58) Field of Classification Search ......... 95/181, 95/183, 186, 188, 206, 235, 236, 237; 423/227, 423/228, 229; 585/835, 840
See application file for complete search history.

(56) References Cited

U.S. PATENT DOCUMENTS

| | | | | |
|---|---|---|---|---|
| 3,598,881 A | * | 8/1971 | Kniel et al. | 585/613 |
| 3,696,162 A | * | 10/1972 | Kniel | 95/174 |
| 3,926,591 A | * | 12/1975 | Wildmoser et al. | 95/180 |
| 4,113,837 A | * | 9/1978 | Kendall et al. | 423/266 |
| 4,575,455 A | * | 3/1986 | Miller | 423/288 |

FOREIGN PATENT DOCUMENTS

DE 1951751 A * 5/1970

* cited by examiner

*Primary Examiner*—Frank M. Lawrence
(74) *Attorney, Agent, or Firm*—L. Kubena

(57) ABSTRACT

A method for removing polymer from an acid gas treating system comprising contacting an acid gas containing stream with an aqueous alkanolamine solution and hydrocarbon solvent to form a mixture of an alkanolamine rich solution having the acid gases or byproducts thereof contained therein and the hydrocarbon solvent, where the hydrocarbon solvent has about 60 to 100 volume % aromatics content; and about 50 to 85 volume % two ring aromatic content, based on the total volume of the solvent.

20 Claims, 2 Drawing Sheets

METHOD FOR REMOVING POLYMER FROM AN ACID GAS TREATING SYSTEM

BACKGROUND OF THE INVENTION

In a typical petrochemical facility having a steam cracker for the pyrolysis of ethane, propane, naphtha, gas oil and other suitable steam cracking feedstock, the effluent from the steam cracker contains acid gases, such as carbon dioxide, hydrogen sulfide and traces of carbonyl sulfide, in addition to desirable olefin products such as ethylene and propylene. In order to recover the desired products, it is necessary to purify the steam cracker effluent to remove the acid gases, for example, by contacting the effluent in an absorption tower with a suitable solvent, such as an aqueous alkanolamine solution. In the absorption tower, the acid gases are absorbed by the aqueous alkanolamine solution to produce an alkanolamine rich solution, which is withdrawn from the absorption tower. The alkanolamine rich solution is then sent to a regenerator where the alkanolamine rich solution is heated to drive off most of the acid gases. The alkanolamine lean solution exiting the regenerator is recycled back to the absorption tower to be contacted with additional steam cracker effluent. Meanwhile, the acid gases may be further upgraded in a sulfur recovery unit to obtain a sulfur product that may be sold.

The problems of polymer formation in acid gas systems, i.e., formation of acid gas byproducts and fouling of units, are well known in the prior art. For example, U.S. Pat. No. 3,696,162 describes polymerization problems encountered in the alkanolamine regenerator and heat exchange system that are caused by the presence of dienes in steam cracker effluent entering the absorption tower and complexes formed from the dienes and acid gas anions. This reference addresses the polymerization problem by introducing a hydrocarbon solvent with the aqueous alkanolamine solution into the absorption tower to absorb the dienes and to act as a solvent for any complexes thereof. In this process, an alkanolamine rich solution phase and a hydrocarbon solvent phase containing absorbed dienes and complexes are formed in the bottom of the absorption tower upon settling. The reference indicates that the alkanolamine rich solution phase and the hydrocarbon solvent phase containing absorbed dienes and complexes may be withdrawn separately or together. If withdrawn together, a portion of the hydrocarbon solvent phase would eventually be separated to provide a surge stream to prevent a buildup of dienes and complexes in the system. The alkanolamine rich solution phase and hydrocarbon solvent phase are then passed together through a heat exchanger and regenerator. The hydrocarbon solvent is described as generally having an initial boiling point of about 80° C., with an aromatic solvent being preferred.

In the system described in U.S. Pat. No. 3,696,162, the alkanolamine solution and the hydrocarbon solvent are circulated together through the absorption tower, heat exchanger and regenerator. Since the hydrocarbon solvent of U.S. Pat. No. 3,696,162 generally has an initial boiling point of about 80° C., contamination of the regenerator overhead occurs and the quality of the sulfur recovered from the acid gases in the sulfur recovery unit is poor. Although U.S. Pat. No. 3,696,162 addresses the polymerization problems when removing acid gases from steam cracker effluent, this reference fails to recognize the problem of contamination of the regenerator overhead with the hydrocarbon solvent and the associated deterioration of the sulfur product that is recovered in the sulfur recovery unit when such contamination occurs.

Typically, acid gases in refinery gas are removed as part of a refinery operation prior to being upgraded in a sulfur recovery unit. Often times, it may be desirable to utilize the adsorption tower used to remove acid gases from the steam cracker effluent for the additional service of absorbing acid gases from the refinery gas. This may be accomplished, for example, by combining the steam cracker effluent with the refinery gas, prior to contact with an aqueous alkanolamine solution in the absorption tower. The acid gases recovered from the steam cracker effluent and the refinery gas may then be upgraded in the sulfur recovery unit.

Applicants have found that when the absorption tower is used for the additional service of absorbing acid gases from refinery gas, the polymerization problems are of a different nature than those described in U.S. Pat. No. 3,696,162, such that the solvent described in U.S. Pat. No. 3,696,162 as generally having an initial boiling point of about 80° C. does not effectively reduce fouling of the regenerator and heat exchangers. Specifically, the polymers that form when absorbing acid gases from steam cracker effluent and refinery gas are of a higher molecular weight and range from a thick syrup-like liquid to rock-hard solid. Such polymers may be a combination of amine degradation products, carbonyl polymers, diene polymers, free radical polymers and corrosion products, and may range in molecular weight from 150 to 10,000.

Accordingly, there is a desire to reduce fouling of the regenerator and heat exchangers when the absorption tower is used to remove acid gases from a mixed feed of steam cracker effluent and refinery gas, while avoiding contamination of the regenerator overhead with the hydrocarbon solvent in order to improve the quality of sulfur recovered in the sulfur recovery unit. Further, there is a desire to easily separate the hydrocarbon solvent phase from the alkanolamine rich solution.

SUMMARY OF THE INVENTION

In order to address the polymerization problem that occurs when the absorption tower is used for absorbing acid gases from steam cracker effluent and/or refinery gas, while minimizing contamination of the regenerator overhead, Applicants have found that the use of heavy aromatic solvents accomplishes these goals, i.e., dissolves the heavier molecular weight polymers and minimizes contamination of the regenerator overhead. However, use of heavy aromatic solvents as the hydrocarbon solvent prevents sufficient settling of the hydrocarbon solvent phase in the absorption tower to cause the separation of the alkanolamine rich solution and the hydrocarbon solvent phase. In other words, the density of the hydrocarbon solvent phase approaches the density of the alkanolamine rich solution such that separation of the alkanolamine rich solution from the hydrocarbon solvent phase by settling or gravity is inefficient and very difficult to achieve.

DETAILED DESCRIPTION OF THE INVENTION

Figure 1:
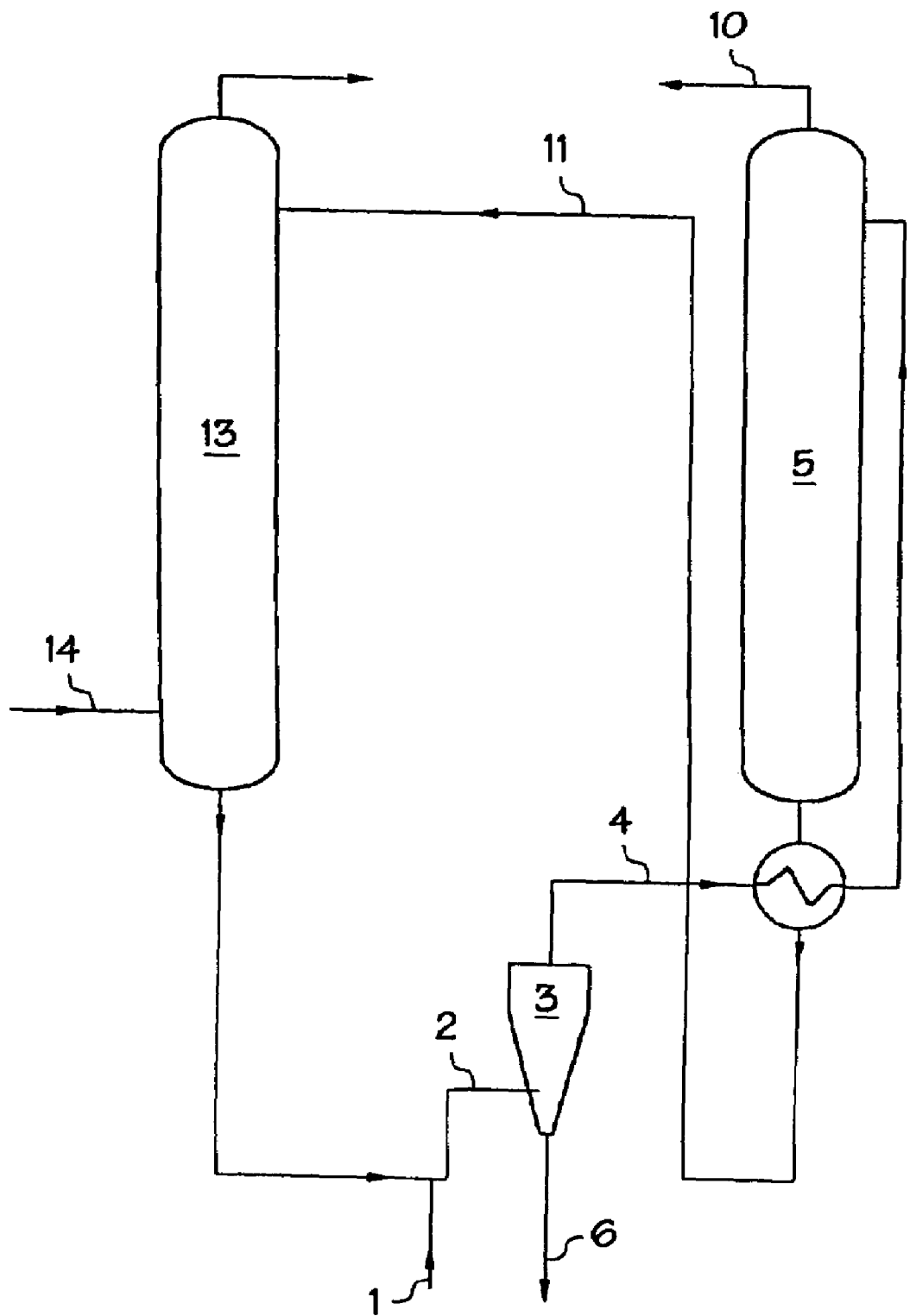
In FIG. 1, fresh hydrocarbon solvent 1 is added to the circulating alkanolamine solution 2. The combined hydrocarbon solvent and alkanolamine rich solution are then separated via the hydrocyclone 3. The alkanolamine rich solution contains residual hydrocarbon solvent 4 and is then routed to the regenerator 5. This residual hydrocarbon solvent dissolves polymer that has accumulated in the system. At an initially high rate of hydrocarbon solvent addition, the amount of hydrocarbon solvent builds up in the system to an equilibrium level. Thus the reject stream 6 from the hydrocyclone eventually becomes a mixture of hydrocarbon solvent and dissolved polymer, i.e., a polymer rich hydrocarbon solvent stream. In the regenerator 5, the alkanolamine rich solution containing residual hydrocarbon solvent 4 is heated to drive off most of the acid gases 10. The alkanolamine lean solution 11 exiting the regenerator 5 is recycled back to the absorption tower 13, to be contacted with additional steam cracker effluent 14.
Figure 2:
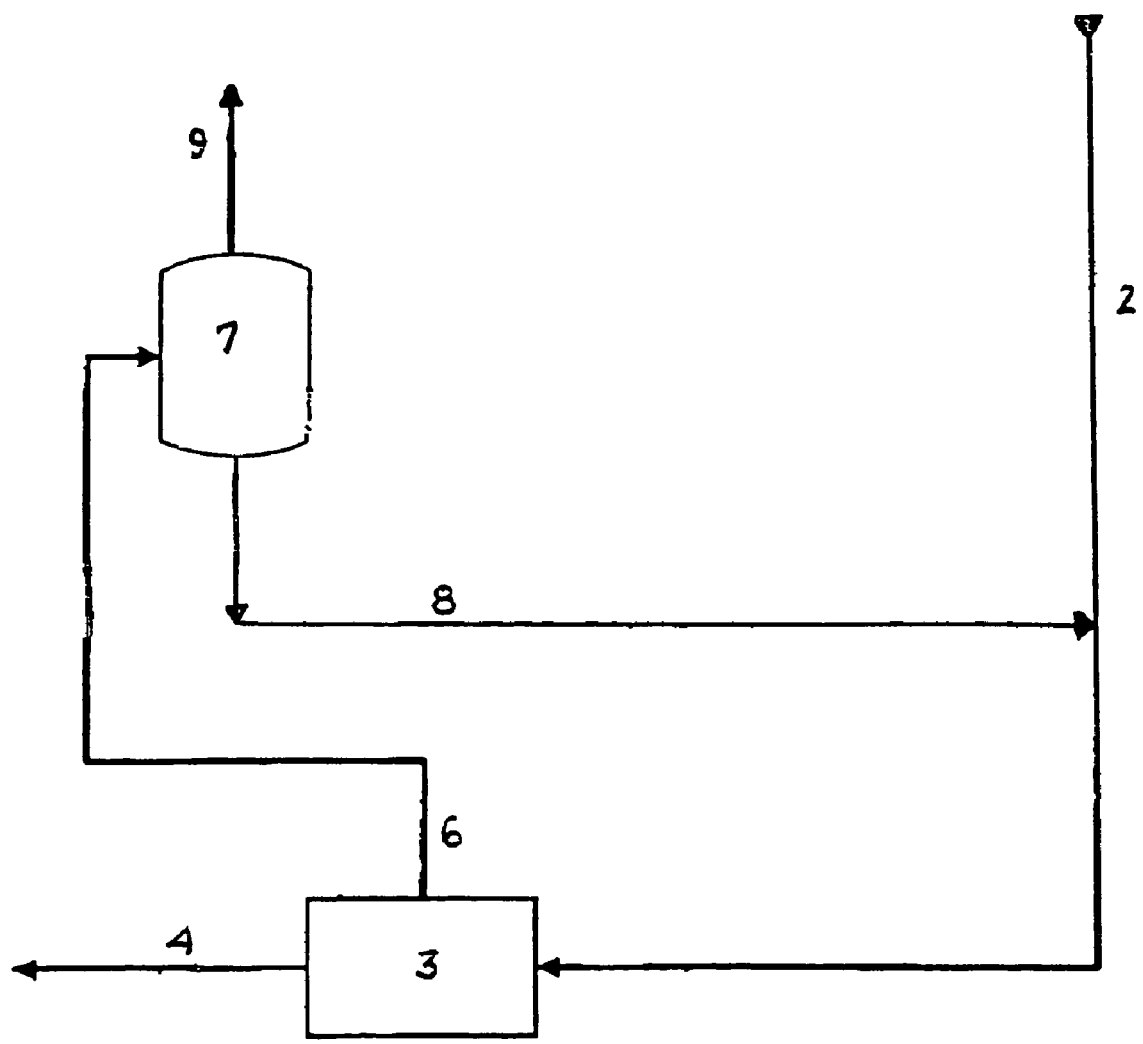
In FIG. 2, this reject stream 6 is routed to a separation drum 7, where the polymer rich hydrocarbon solvent and any residual alkanolamine rich solution form separate phases. The heavier alkanolamine rich solution phase 8 is returned to the circulating alkanolamine system while the lighter polymer rich hydrocarbon solvent phase 9 is routed to a refinery for further processing. After the hydrocarbon solvent has built up to an equilibrium level, the fresh hydrocarbon solvent addition is then gradually reduced.

Reference to an alkanolamine rich solution herein is to an aqueous alkanolamine solution having acid gases contained therein, while reference to an alkanolamine lean solution is to an aqueous alkanolamine solution having most of the acid gases removed therefrom. Reference to a polymer rich hydrocarbon solvent is to a hydrocarbon solvent having polymer contained therein.

In the method according to the present invention, steam cracker effluent and/or refinery gas, each containing acid gases, are sent to an absorption tower where the two streams are contacted with an alkanolamine lean solution. Initially, the alkanolamine lean solution is fresh alkanolamine solution. However, once steady state is achieved, the alkanolamine lean solution may be recycled from the regenerator and may contain polymer rich hydrocarbon solvent, with fresh alkanolamine solution being added at any convenient point for makeup purposes. In either case, the alkanolamine lean solution absorbs the acid gases from the steam cracker effluent and/or refinery gas to form an alkanolamine rich solution, which is recovered from the absorption tower. The absorption tower is typically operated at an inlet temperature of 20 to 60° C., preferably 40 to 50° C. and a pressure of 3 to 50 atm (300 to 5100 kPa), preferably greater than 5 atm (510 kPa).

Fresh or make-up hydrocarbon solvent may be added to the alkanolamine lean solution prior to introduction to the absorption tower; may be introduced separately from the alkanolamine lean solution into the absorption tower; or may be added to the alkanolamine rich solution after withdrawal from the absorption tower. The hydrocarbon solvent is initially added in an amount ranging from about 1 to 5 volume %, and may gradually be reduced to about 0.05 to 1 volume % solvent based on the total volume of circulating alkanolamine solution, depending upon the severity of fouling in the heat exchangers and the regenerator. It is believed that the hydrocarbon solvent dissolves polymer that forms in the heat exchangers and the regenerator due to the high temperatures of operation associated with these two units. However, the polymer rich hydrocarbon solvent and the alkanolamine rich solution have relatively similar densities, so separation by settling or gravity is inefficient and difficult to achieve. According to the present invention, the polymer rich hydrocarbon solvent and alkanolamine rich solution mixture is sent to a hydrocyclone, where the polymer rich hydrocarbon solvent is separated from the alkanolamine rich solution containing the acid gases. The polymer rich hydrocarbon solvent is then removed from the hydrocyclone and may be sent to the refinery for further processing, for example, in a catalytically cracked fractionator to obtain a polymer tar stream or fuel.

The hydrocyclone typically is a pressure vessel containing a number of liners that operate in parallel inside the vessel with the flow of fluid distributed evenly between each liner. The feed stream, typically a fluid, is pumped into each liner, which is designed to force the fluid into a spiral path towards the outlet end of the liner. The spiral path results in centrifugal forces that push the denser fluid, i.e., the aqueous phase, to the wall of the liner. The less dense fluid, i.e., the polymer rich hydrocarbon solvent, is displaced toward the middle of the liner. By maintaining the pressure of the upstream end of the hydrocyclone lower than the pressure at the outlet, the central core of fluid, i.e., the polymer rich hydrocarbon solvent, flows in the opposite direction of the aqueous phase, i.e., the alkanolamine rich solution, and exits through a reject orifice at the upstream end of the hydrocyclone, while the aqueous phase exits at the outlet of the hydrocyclone. The aqueous phase typically contains 0.1 to 2.0 volume % and more preferably 0.1 to 0.5 volume % residual hydrocarbon solvent, based on the total volume of circulating alkanolamine solution.

From the hydrocyclone, the alkanolamine rich solution is sent to a regenerator, which is operated at a temperature ranging from 100 to 160° C., preferably 110 to 140° C. and a pressure ranging from 0.5 to 10 atm (51 to 1,000 kPa), preferably from 0.5 to 1.5 atm (51 to 150 kPa). The hydrocarbon solvent entrained in the alkanolamine rich solution dissolves the polymer that is formed in the heat exchanger and regenerator. Since the regenerator is operated at high temperatures, it is desirable to have a heavy hydrocarbon solvent that would not go overhead in the regenerator and contaminate the regenerator overhead. An alkanolamine lean solution and polymer rich hydrocarbon solvent is withdrawn from the regenerator and recycled back to the absorption tower.

The acid gas components typically found in steam cracker effluent ranges from 10 to 100,000 wppm, preferably 20 to 20,000 wppm $H_2S$; 10 to 100,000 wppm, preferably 10 to 2,000 wppm $CO_2$; and 1 to 100 wppm, preferably 1 to 10 wppm COS.

Refinery gas that may be used as feedstock in the process according to the present invention include off gases from refinery conversion units such as the coker, fluid catalytic cracking units, and saturated light ends from hydrocracking or hydrogenation units. Typically refinery gas may contain from 10 to 100,000 ppm, preferably 100 to 60,000 wppm $H_2S$; 10 to 50,000 ppm, preferably 10 to 20,000 wppm $CO_2$; zero to 50,000 wppm, preferably zero to 2,000 wppm mercaptans; zero to 1,000 wppm, preferably zero to 200 wppm COS; and zero to 1,000 wppm preferably zero to 10 wppm HCN; where the level of acid gas components depends upon if the refinery gas is pretreated in the refinery.

Aqueous alkanolamine solution is any alkanolamine solution conventionally used for acid gas removal, such as monoethanolamine, diethanolamine, diisopropanolamine and methyldiethanolamine. Typically, the alkanolamine is in an aqueous solution, where the amine concentration is from 10 to 50 weight %, preferably 20 to 50 weight %, based on the total weight of the solution. For example, monoethanolamine is typically used at an amine concentration of 15 to 25 weight %; diethanolamine at an amine concentration of 20 to 30 weight %; and methyldiethanolamine at an amine concentration of 40 to 50 weight %.

Solvents that may be used in the process of the present invention include heavy aromatic solvents having 60 to 100 volume %, more preferably greater than 80 volume % aromatics content, and 50 to 85 volume %, preferably 60 to 80 volume % two ring aromatic content, based on the total volume of the solvent. The term "two ring aromatic" as used in this specification is intended to include substituted and unsubstituted naphthalenes such as methyl naphthalenes and dimethyl naphthalenes.

Alternatively, the heavy aromatic solvent may have an initial and final boiling point that each fall within the range of from 150 to 450° C. and a specific gravity in the range of 0.95 to 1.1. Examples of solvents that meet the preferred criteria include a catalytic light heating oil, steam cracked gas oil and heavy aromatic solvents such as Solvesso 200, which is a commercially available aromatic solvent from ExxonMobil Chemical Company. Such solvents will have greater than 80 volume % aromatics content, greater than 20 volume % two ring aromatic content, a boiling range of 190 to 400° C., and a specific gravity of 0.95 to 1.1.

EXAMPLES a. Laboratory testing showed that a light aromatic solvent, e.g. toluene, is very effective in dissolving polymer but because of its high volatility, losses into the regenerator overhead would be very high.

b. 1500 liters of Solvesso 200, a heavy aromatic solvent having at least 99.8 volume % aromatic content, 80 volume % two ring aromatic content, a specific gravity of 1.0 and a boiling range of 232 to 277° C., was added to a 20% monoethanolamine aqueous solution system. The regenerator was operated at 110° C. Spent solvent was recovered via gravity separation.

The fouling tendency of several heat exchangers was monitored during operation, and the results indicated that there was improvement in reducing the fouling tendency of the system. Further, the aromatic solvent was of a sufficiently high boiling point such that there was no contamination of the regenerator overhead. However, because of the small difference in the specific gravities of the spent solvent and the alkanolamine aqueous solution, gravity separation resulted in less than 50% recovery of solvent that was added. Hence, very little polymer was actually removed from the system.

3. Following start up of the present invention, several improvements in performance were observed.

In the past when no hydrocarbon solvent was utilized, the relative fouling factor of a clean exchanger would typically increase exponentially from 1 to 60 over a period of 4 to 8 weeks. Cleaning was invariably required after 8 weeks. The regenerator would behave in a similar manner but at a slower rate (cleaning was required after 8 months).

After start up of the present invention, the exchanger relative fouling factor has been essentially constant at 2. Based on current trends, the exchanger and regenerator run lengths are expected to exceed 1 year and 3 years respectively.

We claim:

1. A method for removing polymer from an acid gas treating system comprising:
   (a) contacting an acid gas containing stream with an aqueous alkanolamine solution and hydrocarbon solvent to form a mixture of an alkanolamine rich solution having the acid gases or byproducts thereof contained therein and the hydrocarbon solvent, where the hydrocarbon solvent has 60 to 100 volume % aromatic content, and 50 to 85 volume % two ring aromatic content, based on the total volume of the solvent;
   (b) separating the mixture from step (a) in a hydrocyclone to separate the hydrocarbon solvent from the alkanolamine rich solution having the acid gases or byproducts thereof; to produce an alkanolamine rich solution having the acid gases or byproducts thereof and hydrocarbon solvent entrained therein;
   (c) regenerating the alkanolamine rich solution having the acid gases or byproducts thereof and hydrocarbon solvent entrained therein in a regenerator to obtain a polymer rich hydrocarbon solvent and an alkanolamine lean solution substantially free of acid gases or byproducts thereof, wherein the hydrocarbon solvent entrained in the alkanolamine rich solution having the acid gases or byproducts thereof is sufficient to dissolve polymer formation in the regenerator.

2. A method for removing polymer from an acid gas treating system comprising:
   (a) contacting an acid gas containing stream with an aqueous alkanolamine solution to form an alkanolamine rich solution having the acid gases or byproducts thereof contained therein;
   (b) mixing the alkanolamine rich solution having the acid gases or byproducts thereof with a hydrocarbon solvent having 60 to 100 volume % aromatic content, and 50 to 85 volume % two ring aromatic content, based on the total volume of the solvent;
   (c) separating the mixture from step (b) in a hydrocyclone to separate the hydrocarbon solvent from the alkanolamine rich solution having the acid gases or byproducts thereof; to produce an alkanolamine rich solution having the acid gases or byproducts thereof and from 0.1 to 2.0 volume % hydrocarbon solvent entrained therein; and
   (d) passing the solution having the acid gases or byproducts thereof and hydrocarbon solvent of step (d) through a regenerator to dissolve polymer buildup in the regenerator and to obtain an alkanolamine lean solution with entrained polymer rich hydrocarbon solvent and that is substantially free of acid gases or byproducts thereof.

3. The method of claim 1, further comprising the step of recycling the polymer rich hydrocarbon solvent and alkanolamine lean solution substantially free of acid gases or byproducts thereof to the absorption tower for use as the aqueous alkanolamine solution of step (a).

4. The method of claim 2, farther comprising the step of recycling the polymer rich hydrocarbon solvent and alkanolamine lean solution substantially free of acid gases or byproducts thereof to the absorption tower for use as the aqueous alkanolamine solution of step (a).

5. The method of claim 1 where the acid gas containing stream is steam cracker effluent.

6. The method of claim 2, where the acid gas containing stream is steam cracker effluent.

7. The method of claim 1, where the acid gas containing stream comprises steam cracker effluent and refinery gas.

8. The method of claim 2, where the acid gas containing stream comprises steam cracker effluent and refinery gas.

9. The method of claim 1, further comprising the step of upgrading the acid gases and byproducts thereof in a sulfur recovery unit.

10. The method of claim 2, further comprising the step of upgrading the acid gases and byproducts thereof in a sulfur recovery unit.

11. The method of claim 2, further comprising the step of passing the alkanolamine rich solution having the acid gases or byproducts thereof and hydrocarbon solvent entrained therein of step (c) through a heat exchanger to dissolve polymer buildup therein, prior to step (d).

12. The method of claim 1, where 0.1 to 2.0 volume % hydrocarbon solvent is entrained in the alkanolamine rich solution having the acid gases or byproducts thereof of step (c).

13. The method of claim 1, where the hydrocarbon solvent has greater than 80 volume % aromatic content.

14. The method of claim 2, where the hydrocarbon solvent has greater than 80 volume % aromatic content.

15. The method of claim 13, where the hydrocarbon solvent has 60 to 80 volume % two ring aromatic content.

16. The method of claim 14, where the hydrocarbon solvent has 60 to 80 volume % two ring aromatic content.

17. The method of claim 1, where the initial and final boiling point of the hydrocarbon solvent each falls within the range of from 150 to 450° C.

18. The method of claim 2, where the initial and final boiling point of the hydrocarbon solvent each falls within the range of from 150 to 450° C.

19. A method for removing polymer from an acid gas treating system comprising:
   (a) contacting an acid gas containing stream with an aqueous alkanolamine solution and hydrocarbon solvent to form a mixture of an alkanolamine rich solution having the acid gases or byproducts thereof contained therein and the hydrocarbon solvent, where the hydrocarbon solvent has 60 to 100 volume % aromatic content; and a specific gravity ranging from 0.95 to 1.1;
   (b) separating the mixture from step (a) in a hydrocyclone to separate the hydrocarbon solvent from the alkanol amine rich solution having the acid gases or byproducts thereof; to produce an alkanolamine rich solution having the acid gases or byproducts thereof and hydrocarbon solvent entrained therein;
   (c) regenerating the alkanolamine rich solution having the acid gases or byproducts thereof and hydrocarbon solvent entrained therein in a regenerator to obtain a polymer rich hydrocarbon solvent and an alkanolamine lean solution substantially free of acid gases or byproducts thereof, wherein the hydrocarbon solvent entrained in the alkanolamine rich solution having the acid gases or byproducts thereof is sufficient to dissolve polymer formation in the regenerator.

20. The method of claim 19, where the hydrocarbon solvent has greater than 80 volume % aromatic content.

\* \* \* \* \*